United States Patent [19]
Swinley

[11] Patent Number: 5,678,949
[45] Date of Patent: Oct. 21, 1997

[54] LOCKING DEVICE FOR USE WITH SHAFTS OR TUBES

[75] Inventor: George Swinley, Castleford, United Kingdom

[73] Assignee: NSK-RHP European Technology Co. Limited, United Kingdom

[21] Appl. No.: 619,591

[22] PCT Filed: Sep. 26, 1994

[86] PCT No.: PCT/GB94/02090

§ 371 Date: Mar. 26, 1996

§ 102(e) Date: Mar. 26, 1996

[87] PCT Pub. No.: WO95/09310

PCT Pub. Date: Apr. 6, 1995

[30] Foreign Application Priority Data

Sep. 27, 1993 [GB] United Kingdom ............... 9319880

[51] Int. Cl.⁶ ........................................... F16C 35/063
[52] U.S. Cl. ........................... 403/362; 403/373; 384/541
[58] Field of Search ........................... 403/362, 367, 403/366, 374, 373, 371, 370, 365, 377, 409.1; 384/541

[56] References Cited

U.S. PATENT DOCUMENTS

| | | |
|---|---|---|
| 1,612,465 | 12/1926 | Parsons . |
| 2,098,709 | 11/1937 | Murden et al. ............... 403/371 X |
| 2,213,400 | 9/1940 | Laughridge ............... 384/541 X |
| 2,226,524 | 12/1940 | Runge et al. . |
| 2,273,379 | 2/1942 | Searles ............... 403/377 X |
| 2,718,415 | 9/1955 | Reynolds ............... 403/362 X |
| 3,239,292 | 3/1966 | Howe, Jr. et al. ............... 384/541 |
| 3,294,459 | 12/1966 | Howe, Jr. ............... 384/541 |
| 3,517,976 | 6/1970 | McAllister . |
| 3,588,208 | 6/1971 | Kane ............... 384/541 |
| 3,918,779 | 11/1975 | Halliger et al. ............... 403/374 X |
| 4,097,167 | 6/1978 | Stratienko ............... 403/374 |
| 4,164,063 | 8/1979 | Cenko et al. . |
| 4,403,814 | 9/1983 | Koss et al. . |

FOREIGN PATENT DOCUMENTS

| | | | |
|---|---|---|---|
| 552270 | 1/1958 | Canada ............... 384/541 |
| 0088589 | 9/1983 | European Pat. Off. . |
| 1156627 | 5/1958 | France . |
| 1287299 | 1/1962 | France ............... 384/541 |
| 3822472 | 1/1990 | Germany . |

*Primary Examiner*—Harry C. Kim
*Attorney, Agent, or Firm*—Samuels, Gauthier, Stevens & Reppert

[57] ABSTRACT

A locking device for clamping onto a shaft is composed of a collar and a ring both fitted onto the shaft. The collar has an end wall and an axial region extending over an outer inclined contact surface of the ring. The ring and the collar end wall have inner contact surfaces confronting the outer surface of the shaft which are separated by sliding radial surfaces of the collar and the ring. Screw-threaded elements set in threaded bores in the axial region of the collar can be tightened against the outer contact surface of the ring to cause the inner contact surfaces to exert clamping force on the shaft.

18 Claims, 1 Drawing Sheet

LOCKING DEVICE FOR USE WITH SHAFTS OR TUBES

TECHNICAL FIELD

The present invention relates to a device which can be selectively locked or clamped to a shaft or tube.

BACKGROUND TO THE INVENTION

In many mechanical applications it is necessary to clamp one component, such as a bearing, a sprocket or a pulley, to a rotatable component, such as a shaft or spindle.

One simple way of clamping the component in place is to use one or more grub or set screws which engage with the outer surface of the shaft. The set screws can then be received in screw threaded or tapped bores in the component. In the case of a bearing the screws are placed in tapped bores in the inner ring. The screws tend to damage the shaft particularly if the component is removed from the shaft from time to time. The tightening of the screws also cause high tensile stresses in the inner ring and fracture can occur. The provision of the tapped bores also entails additional operations. Another well known design utilizes an eccentric collar with a set screw which when engaged also tends to damage the shaft. Moreover it is not easy to establish the direction of tightening or loosening when releasing the collar and the collar is prone to damage. The eccentric collar also requires specifical machining.

GB-A-978361 describes a clamp with an outer holding member and an inner ring retained in a recess in the holding member. A single set screw in a tapped bore in the holding member forces the ring and the holding member apart and effects clamping to the shaft.

EP-A-0088589 describes a fluid coupling with a shaft having a boss portion with a blind opening for receiving another stub shaft supporting a hub and pulley assembly in coaxial relation to the coupling shaft. An adaptor is clamped to the hub assembly and has an axial region extending around the boss portion. The axial region of the adaptor has screw-threaded bores in diametrically opposed positions into which set screws are fitted. The boss portion has a v-shaped groove into which the set screws can be engaged to displace the boss portion and the shaft axially to locate radial end wall surfaces of the adaptor and the boss portion.

A general object of the present invention is to provide an improved form of locking device.

DISCLOSURE OF THE INVENTION

According to the invention, and as is known from EP-A-0088589, there is provided a device for locking to a component rotatable about an axis; said device comprising a collar with an end wall with a surface confronting a surface of the component and a region extending axially from the end wall, a ring disposed between the axial region of the collar and the component the ring having a first surface confronting the surface of the component and a second surface which is inclined relative to the axis of rotation to converge with respect to the axis of rotation in a direction away from the end wall and several screw-threaded elements received in threaded bores extending radially through the axial region of the collar. In accordance with the invention the confronting surfaces of the collar and the ring form contact surfaces for contacting the surface of the component, the threaded bores are spaced apart relative to the rotational axis other than at 180° and the screw-threaded elements can be tightened to bear into or against the second contact surface of the ring to cause the contact surface of the collar and the first contact surface of the ring to exert radial clamping force on the component at diametrically opposed zones.

The ends of the screw-threaded elements may have plane surfaces parallel to the rotational axis or set at an angle which may have the same sense as the angle of the second contact surface of the ring. It is possible to provide shallow depressions, recesses or blind bores in the second contact surface for receiving the ends of the screw-threaded elements.

Preferably the surfaces of the collar and the ring which contact the component and exert clamping force therein lie directly alongside one another along the axis of rotation. Between these contact surfaces there may be radial surfaces of the ring and the collar which engage on one another and slide against one another as the screw elements are tightened or released.

The rotatable component may be a shaft or spindle with the locking device fitted onto its exterior periphery or a hollow shaft or tube with the locking device fitted inside. In the first case the contact surface of the collar can be formed by a bore in the end wall whilst in the second case the contact surface of the collar can be formed by the outer periphery of the end wall.

It is not essential for the rotatable component to have a circular cross-section and the component can have a polygonal cross-section.

The invention may be understood more readily and various other aspects and features of the invention may become apparent, from consideration of the following description and accompanying drawings.

BRIEF DESCRIPTION OF DRAWINGS

Embodiments of the invention will now be described by way of examples only, with reference to the accompanying drawings therein.

BEST MODES FOR CARRYING OUT THE INVENTION

Figure 1:
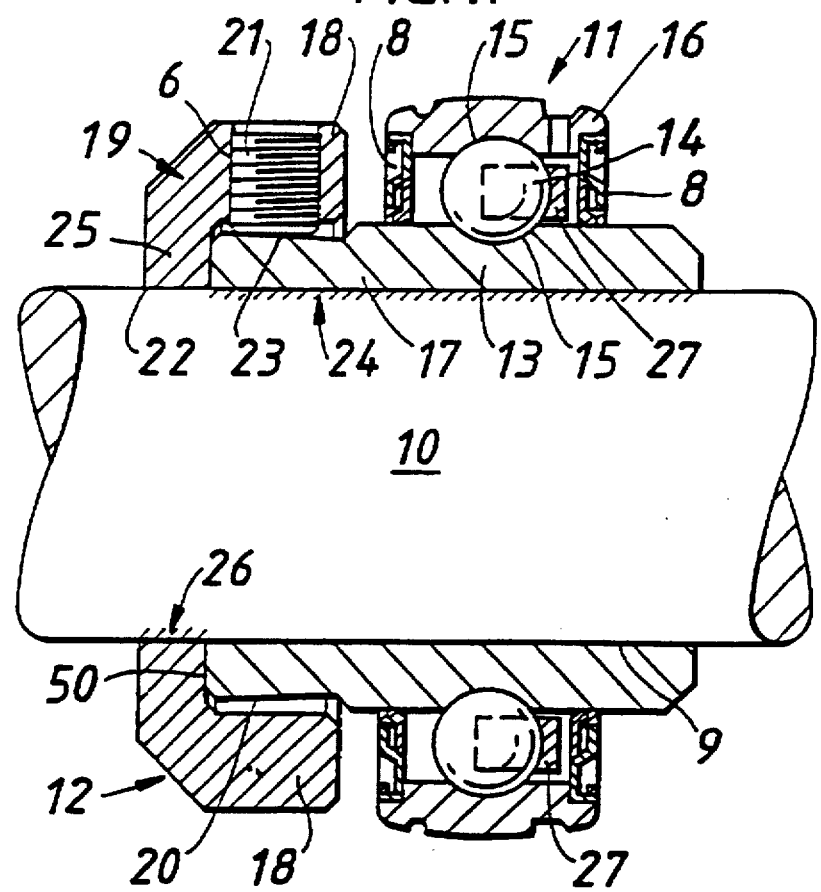
FIG. 1 is a part sectional representation of an assembly employing a locking device constructed in accordance with the invention and FIG. 2 is a schematic representation of another assembly and locking device constructed in accordance with the invention.

As shown in FIG. 1, to a shaft 10 there is fitted a rolling-element bearing 11 and a locking device 12. The bearing 11 is composed of an extended inner ring 13 which is to be secured to the shaft 10 in a non-rotatable manner. The ring 13 has an inner contact surface 9 extending parallel to the outer peripheral surface of the shaft 10. A set of rolling elements, here in the form of balls 14, is disposed in raceways 15 between the inner ring 13 and an outer ring 16. The balls 14 are spaced apart round the raceways 15 with a cage 27 and seals 8 are mounted between the rings 13, 16.

An axial end region 17 of the inner ring 13 is surrounded by an axial portion 18 of a collar 19. The collar 19 has an end wall 25 with a bore forming a contact surface 22 fitted over the shaft 10 with the surface 22 forming a continuation of the inner contact surface 9 of the ring 13.

The outer surface of the region 17 of the bearing inner ring 13 is relieved to provide an outer contact surface 20 which is tapered to extend at an angle to the axis of the shaft 10. The surface 20 converges towards the shaft axis in the direction of the bearing 11. A typical angle for the surface 20 is 3° and generally an angle in the range 1° to 5° is preferred.

Two screws 21 are located in threaded bores 6 in the axial portion 18 of the collar 19 disposed 120° apart around the axis of the shaft 10. This angle is not critical and may vary depending on the application. The screws 21 can be displaced inwardly of the bores 6 to engage on the outer contact surface 20 of the ring 13. In a modified arrangement the surface 20 has shallow recesses or depressions or blind bores for locating and receiving the ends 23 of the screws 21. The inner ring 13 of the bearing 11 and the collar 19 can be easily fitted onto the shaft 10 and the screws 21 are then tightened to some predetermined torque. The ends 23 of the screws 21, which can be tapered at the same angle as the contact surface 20, press on the outer contact surface 20 to displace the axial end region 17 of the inner ring 13 and the axial portion 18 of the collar 19 radially apart. This in turn causes diametrically opposed contact surface zones 24, 26 of the inner contact surface 9 of the ring 13 and of the contact surface 22 in the end wall 25 of the collar 19 to clamp against the shaft 10 uniformly without causing damage to the shaft 10. To release the locking device 12, the screws 21 are untightened to permit the collar 19 and the bearing 11 to be withdrawn from the shaft 10.

The end wall 25 of the collar 19 and the end of the axial region 17 of the ring 13 abut to form sliding guide surfaces 50 as the screws 21 are tightened or released.

Figure 2:
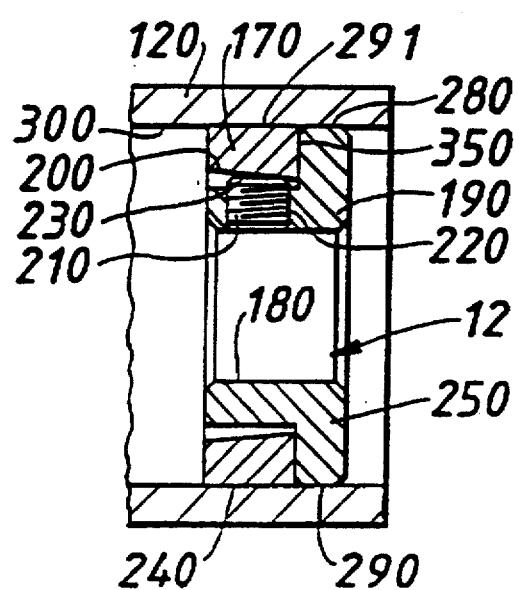

FIG. 2 depicts another locking device 12 which is fitted inside a hollow shaft or tube 120. The locking device is again composed of a collar 190 with an axial region 180 with two angularly offset threaded bores 220 receiving screws 210. An end wall 250 of the collar has an outer peripheral contact surface 280 which is parallel to and confronts an inner surface 300 of the tube 120. A ring 170 has an outer peripheral contact surface 240 which is parallel to and likewise confronts the inner surface 300 of the tube 120 and an inner contact surface 200 which is tapered at an angle to the axis of the tube 120. As with the FIG. 1 embodiment, the surface 200 can be inclined at an angle of 1° to 5° and preferably 3° to the axis of the tube 120 and/or the surface 200 can contain shallow recesses, depressions or blind bores for receiving the ends 230 of the screws 210.

The device 12 is locked to the tube 120 by tightening the screws 210 to cause their ends 230 to displace the axial region 180 of the collar 190 and the ring 170 radially apart. This in turn causes diametrically opposed contact surface zones 290, 291 of the contact surface 280 of the collar end wall 250 and of the surface 240 of the ring 170 to bear against the inner surface 300 of the tube 120 to lock the device in place.

The ring 170 and the end wall of the collar 190 have radial faces which abut and establish slidable guide surfaces 350 as the screws 210 are tightened or released. The device can be used to provide an abutment or location for some other components such as a bearing.

In contrast to some known forms of locking device or mechanisms, a device in accordance with the invention does not damage the rotatable component and is easily fitted and removed repeatedly. In the FIG. 1 arrangement the inner ring 13 is simply extended and easily machined in one operation. There is no need to provide tapped bores in the ring 13. Also since no excessive tensile stresses are created on the inner ring 13 there is no danger of fracture for this reason. There is also no distortion so the raceways for the balls are unaffected.

I claim:
1. A device for locking to a component rotatable about an axis; said device comprising a collar with an end wall containing a bore defining an inner surface for fitting over and confronting an outer surface of the component and a region extending axially away from the end wall; and a ring for disposing between the axial region of the collar and the component, the ring having a first inner surface for fitting over and confronting said surface of the component and a second outer surface which is inclined relative to the axis of rotation to converge with respect to the axis of rotation in a direction away from the end wall and several screw-threaded elements received in threaded bores extending radially through the axial region of the collar and generally perpendicular to the axis of rotation and spaced apart relative to the rotational axis other than at 180°, wherein the confronting surfaces of the collar and the ring act as contact surfaces for contacting the outer surface of the component during use and the screw-threaded elements can be tightened to bear into or against the second surface of the ring whereby to cause the inner surface of the collar and the first surface of the ring to exert radial clamping force on the component at diametrically opposed zones.

2. A device according to claim 1, wherein during use the inner surface of the collar and the first surface of the ring lie closely adjacent to form a continuation of one another.

3. A device according to claim 2, wherein between the inner surface of the collar and the first surface of the ring there are radially abutting guide surfaces of the collar and of the ring which slide against one another as the screw-threaded elements are tightened or released during use.

4. A device according to claim 1, wherein the screw-threaded elements have end surfaces for contacting the second surface of the ring which are inclined relative to the axis of rotation.

5. A device according to claim 1, wherein there are two screw-threaded elements.

6. A device according to claim 5, wherein the threaded bores for receiving the screw-threaded elements are spaced apart by 120° relative to the axis of rotation.

7. A device according to claim 1, wherein the second contact surface of the ring has one of depressions, recesses or blind bores for receiving the ends of the screw-threaded elements.

8. In combination: a component rotatable about an axis and a device for selectively locking to the component, said device comprising a collar with an end wall containing a bore defining an inner surface fitting over and confronting an outer surface of the component and a region extending axially away from the end wall; a ring disposed between the axial region of the collar and the component, the ring having a first inner surface fitting over and confronting said surface of the component and a second outer surface which is inclined relative to the axis of rotation to converge with respect to the axis of rotation in a direction away from the end wall and several screw-threaded elements received in threaded bores extending radially through the axial region of the collar and generally perpendicular to the axis of rotation and spaced apart relative to the rotational axis other that at 180°, wherein the confronting surfaces of the collar and the ring act as contact surfaces contacting the surface of the component and the screw-threaded elements can be tightened to bear into or against the second surface of the ring whereby to cause the inner surface of the collar and the first surface of the ring to exert radial clamping force on the component at diametrically opposed zones.

9. The combination of claim 8, wherein the rotatable component is a solid shaft or spindle and the ring is formed by an extended region of the inner ring of a roller element bearing.

10. A device for locking to a hollow component rotatable about an axis; said device comprising a collar with an end wall defining an outer surface for fitting into and confronting an inner surface of the component and a region extending axially away from the end wall, a ring for disposing between the axial region of the collar and the component, the ring having a first outer surface for fitting over and confronting said inner surface of the component and a second inner surface which is inclined relative to the axis of rotation to diverge with respect to the axis of rotation in a direction away from the end wall and several screw-threaded elements received in threaded bores extending radially through the axial region of the collar and generally perpendicular to the axis of rotation and spaced apart relative to the rotational axis other than at 180°, wherein the confronting surfaces of the collar and the ring act as contact surfaces for contacting the inner surface of the component during use and the screw-threaded elements can be tightened to bear into or against the second inner surface of the ring whereby to cause the outer surface of the collar and the first surface of the ring to exert radial clamping force on the component at diametrically opposed zones.

11. A device according to claim 10, wherein during use the outer surface of the collar and the first surface of the ring lie closely adjacent to form a continuation of one another.

12. A device according to claim 11, wherein between the outer surface of the collar and the first surface of the ring there are radially abutting guide surfaces of the collar and of the ring which slide against one another as the screw-threaded elements are tightened or released during use.

13. A device according to claim 10, wherein the screw-threaded elements have end surfaces for contacting the second inner surface of the ring which are inclined relative to the axis of rotation.

14. A device according to claim 10, wherein there are two screw-threaded elements.

15. A device according to claim 14, wherein the threaded bores for receiving the screw-threaded elements are spaced apart by 120° relative to the axis of rotation.

16. A device according to claim 10, wherein the second inner surface of the ring has one of depressions, recesses or blind bores for receiving the ends of the screw-threaded elements.

17. In combination: a hollow component rotatable about an axis and a device for selectively locking to the component, said device comprising a collar with an end wall defining an outer surface confronting an inner surface of the component and a region extending axially away from the end wall, a ring disposed between the axial region of the collar and the component, the ring having a first outer surface confronting said inner surface of the component and a second inner surface which is inclined relative to the axis of rotation to diverge with respect to the axis of rotation in a direction away from the end wall and several screw-threaded elements received in threaded bores extending radially through the axial region of the collar and generally perpendicular to the axis of rotation and spaced apart relative to the rotational axis other than at 180°, wherein the confronting surfaces of the collar and the ring act as contact surfaces for contacting the inner surface of the component during use and the screw-threaded elements can be tightened to bear into or against the second inner surface of the ring whereby to cause the outer surface of the collar and the first surface of the ring to exert radial clamping force on the component at diametrically opposed zones.

18. A device for locking to a component rotatable about an axis; said device comprising a collar with an end wall defining a first surface for fitting and confronting a surface of the component with the first surface of the end wall extending parallel to said surface of the component and a region extending axially away from the end wall; a ring for disposing between the axial region of the collar and the component, the ring having a first surface for fitting and confronting said surface of the component with the first surface of the ring extending parallel to said surface of the component and a second surface opposite said first surface, said second surface being inclined relative to the axis of rotation to converge or diverge with respect to the axis of rotation in a direction away from the end wall and several screw-threaded elements received in threaded bores extending radially through the axial region of the collar and generally perpendicular to the axis of rotation and spaced apart relative to the rotational axis other that at 180°, wherein the first surfaces of the collar and the ring act as contact surfaces for contacting said surface of the component at axially-spaced locations during use and the screw-threaded elements can be tightened to bear into or against the second surface of the ring whereby to displace the collar and the ring relative to the component to cause the first surface of the collar and the first surface of the ring to exert radial clamping force on said surface of the component at diametrically opposed and axially spaced apart zones.

* * * * *